(12) United States Patent
Graube

(10) Patent No.: US 9,241,262 B2
(45) Date of Patent: *Jan. 19, 2016

(54) APPARATUS AND METHOD FOR SECURING BEACONS

(71) Applicant: QUALCOMM TECHNOLOGIES INTERNATIONAL, LTD., Cambridge (GB)

(72) Inventor: Nicolas Graube, Barrington (GB)

(73) Assignee: QUALCOMM Technologies International, LTD., Cambridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/512,747

(22) Filed: Oct. 13, 2014

(65) Prior Publication Data
US 2015/0036823 A1 Feb. 5, 2015

Related U.S. Application Data

(63) Continuation of application No. 13/956,687, filed on Aug. 1, 2013, now Pat. No. 8,953,794.

(51) Int. Cl.
| | |
|---|---|
| *H04L 29/06* | (2006.01) |
| *H04W 12/04* | (2009.01) |
| *H04L 9/08* | (2006.01) |
| *H04W 12/02* | (2009.01) |

(52) U.S. Cl.
CPC ............ *H04W 12/04* (2013.01); *H04L 9/0869* (2013.01); *H04L 63/0414* (2013.01); *H04L 63/068* (2013.01); *H04W 12/02* (2013.01)

(58) Field of Classification Search
CPC .......................... H04L 63/0414; H04L 63/068
USPC .................................................... 380/44, 277
See application file for complete search history.

(56) References Cited

U.S. PATENT DOCUMENTS

| | | | |
|---|---|---|---|
| 8,042,155 B1* | 10/2011 | Chang et al. ...................... 726/3 |
| 2004/0134984 A1* | 7/2004 | Powell ............... G06K 7/10049 235/451 |
| 2005/0036620 A1* | 2/2005 | Casden ............... G06F 21/6209 380/259 |

(Continued)

FOREIGN PATENT DOCUMENTS

| | | |
|---|---|---|
| WO | WO 2008/091978 A2 | 7/2008 |
| WO | WO 2011/025843 A1 | 3/2011 |

OTHER PUBLICATIONS

Office Action for U.S. Appl. No. 13/956,687, dated Jan. 9, 2014.

(Continued)

*Primary Examiner* — Izunna Okeke
*Assistant Examiner* — Ali Shayanfar
(74) *Attorney, Agent, or Firm* — The Marbury Law Group, PLLC

(57) ABSTRACT

A short-range communication tag includes a transmitter, a clock circuit providing a clock value and a memory containing a unique identification value. The tag further includes a processor which generates encryption keys with a period of K seconds and combines the unique identification value with the encryption key, according to a predetermined encryption method, to generate an obfuscated unique identification value. The tag further includes a short-range transmitter to transmit the tag identification value.

14 Claims, 4 Drawing Sheets

(56) References Cited

U.S. PATENT DOCUMENTS

| | | |
|---|---|---|
| 2006/0065731 A1 | 3/2006 | Powell et al. |
| 2009/0292918 A1* | 11/2009 | Mori et al. .................... 713/168 |
| 2010/0153719 A1 | 6/2010 | Duc et al. |
| 2013/0089200 A1* | 4/2013 | Drader et al. ................... 380/44 |
| 2014/0156396 A1* | 6/2014 | deKozan ............ G06Q 30/0261 705/14.53 |

OTHER PUBLICATIONS

GB Search Report issued in related GB Application No. 1406141.0, dated Sep. 18, 2014.

Notice of Allowance for U.S. Appl. No. 13/956,687, dated Jul. 30, 2014.

* cited by examiner

APPARATUS AND METHOD FOR SECURING BEACONS

CROSS REFERENCE TO RELATED APPLICATIONS

This Application is a Continuation of U.S. application Ser. No. 13/956,687, filed Aug. 1, 2013, entitled APPARATUS AND METHOD FOR SECURING BEACONS, the contents of which are incorporated herein.

BACKGROUND OF THE INVENTION

The present invention concerns beacon transmission systems and, in particular, systems and methods for enabling encryption and decryption of transmitted beacon identifiers.

Short-range beacons using technologies such as infrared, ultrasonics, near-field communications (NFC) and Bluetooth® have been used to determine proximity between a mobile listening device and a beacon. In an example system, a beacon transmitter broadcasts a signal containing its identifier (ID) and a mobile device, proximate to the beacon receives the signal and determines the proximity of the mobile device to the beacon based on characteristics of the received signal. The beacon ID may be a Bluetooth® beacon transmitted by a first device, for example a mobile telephone, that desirably maintains a close proximate relationship with a second device, for example a Bluetooth headset even when not in use. When these devices are separated, for example because the user has inadvertently left the phone on a restaurant table, the headset may emit an alarm.

SUMMARY OF THE INVENTION

A short-range communication tag includes a transmitter, a clock circuit providing a clock value and a memory containing an N-bit unique identification value. The tag further includes a processor which generates encryption keys, having at least N bits, that change with a period of K seconds. The processor combines the unique identification value with the encryption key, according to a predetermined encryption method, to generate an encrypted unique identification value. The tag further includes a short-range transmitter to transmit the tag identification value.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. According to common practice, the various features of the drawings are not drawn to the scale. Also, the dimensions of the various features are arbitrarily expanded or reduced for clarity. Included in the drawings are the following figures.

DETAILED DESCRIPTION OF THE INVENTION

Figure 1:
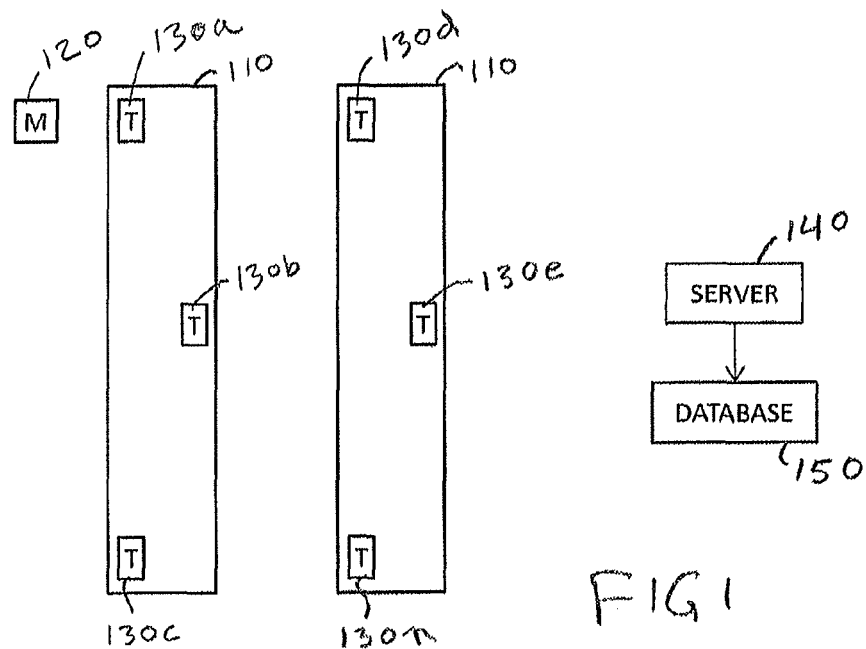
FIG. 1 is a top plan view of a retail environment including an example embodiment of the invention.

Proximity aware devices may be used to trigger specific actions based on a sensed proximity, for example, of a mobile device to a transponder. The materials that follow describe proximity awareness in the context of a retail establishment. It is contemplated, however, that the underlying technology has broader application including, without limitation, security, enterprise workflow, gaming and social interactions.

An example proximity system employs a plurality of transponders each of which may transmit a signal to a listening device. Each transponder may be associated with a region of interest. A region of interest may be a particular region of an area covered by the transponders, for example, a portion of a shelving unit in a retail store. The transponder associated with the region of interest may be used to define one or more zones. Signaling between a client listening device and the transponder(s) may establish at least a probability of the client device being in a particular zone relative to the transponder. Each of the zones may be considered to be a range of locations relative to each transponder indicating, for example, respectively different levels of proximity between the listening device and the region of interest in the covered area.

Although the embodiments described below employ fixed transponders, it is contemplated that mobile transponders, possibly with MEMs sensors (not shown), may be used in some embodiments of the invention. For example, a transponder may be associated with a person and conditions and actions may be specified for or by a client device based on a zone of proximity to the person and transponder status as indicated by the MEMs sensors. This type of transponder may be useful for security applications where, for example, sensing transponder signals is used to selective allow access to areas of a building. It may also be useful for social applications or gaming in which, for example, one user being proximate to another user is a condition for an action that conveys benefits or penalties to one or both users.

An application using the proximity information may associate one or more actions with each of the zones of each of the transponders and may also associate conditions that trigger the actions. In addition, the system may include functionality by which the conditions for actions associated with the zones may include a number of factors including, without limitation, the zone currently occupied by the listening device, zones proximate to the currently occupied zone, zones currently occupied by other listening devices the current status or environment of the covered area and/or the status or environment of an area surrounding the covered area.

The owners or operators of the tag devices, for example, a retail store manager, may associate the tags with an application to be run on the listening device by a user, for example a shopper in the store. An example application sends electronic coupons to users through the listening devices when the listening device determines that it is within a predetermined zone relative to the tag.

These tags, however, may be used for other purposes and the store manager may not approve of these uses. For example, a competitor may provide an application that, as the customer enters a predetermined zone, indicates items in that zone that can be purchased at a lower cost from the competitor. This unauthorized use of the signals being transmitted by the tag is facilitated if the tag ID being broadcast by each tag does not change over time. Once the competitor determines the correspondence between the tag ID and the associated products, he/she can provide an application that uses the ID information. Another example may be in a game environment. The company providing the gaming hardware may not want others to make unauthorized use of the equipment as it may injure its customers. A final example is geofencing, where the tags may be used to establish boundaries and/or protect confidential information. Thus, a secure tag broadcasting system may be beneficial for at least some uses of the tags.

FIG. 1 is a top-plan view of a retail establishment that may include an example embodiment of the invention. In this venue, tags 130a-130n are placed in predetermined positions on shelving units 110. A mobile listening device 120, including an application provided by or on behalf of the retail company, may make use of the tag information as the user walks through the store, for example to extend coupon offers to the user as he/she passes by the tagged shelf locations.

In this embodiment, the user may interact with a server 140 coupled to a database 150 that are operated by the retail establishment or the retail company. The server 140 and database 150, for example, may use data about the customer from a customer loyalty program to predict what offers the user would be most likely to accept relative to the tagged locations. This information may be downloaded to the listening device when the user registers it or it may be communicated to the user dynamically, by the server 140, as the user shops.

In the one implementation, each tag 130 combines its Tag ID with other information so that the data transmitted by the tag 130 appears to be periodically changing. The example tag repeatedly transmits its tag ID in an interval that may range from a fraction of a second to several seconds. If the tag ID were not combined with other data, the transmitted tag data would not change. Because of the other data, however, the transmitted tag data changes in a way that makes it difficult for an unsynchronized receiver to decode meaningful data. The application in the listening device 120 is programmed to extract the tag ID from the data it receives from the tag and take appropriate action based on the received data. Because the tag data is continually changing, it is difficult for an unauthorized user to determine how to obtain the tag ID from the data.

In the example embodiment described below, the tag device includes a pseudo random number (PN) generator that generates a sequence of encryption key values. The key values are used one at a time to encrypt the data transmitted by the tag using a symmetric encryption algorithm such as the advanced encryption standard (AES), data encryption standard (DES) or triple DES. In addition to generating the key value, the tag may also generate and add a Salt to the tag data. A Salt is a random or pseudo-random number that is combined with a data value in a known manner so that it may be deleted or ignored when the data is received and decoded.

It is contemplated that other methods may be used to generate the encryption keys. For example, a number of keys may be stored in a table and accessed either sequentially or pseudo-randomly from the table. Alternatively, a hashing algorithm may be applied to a seed value to generate each new encryption key. This encryption key may then become the seed value for generating the next encryption key according to the hashing algorithm. In the described embodiments, the same key generation algorithm is used by the tag 130 and the server 140.

Figure 2:
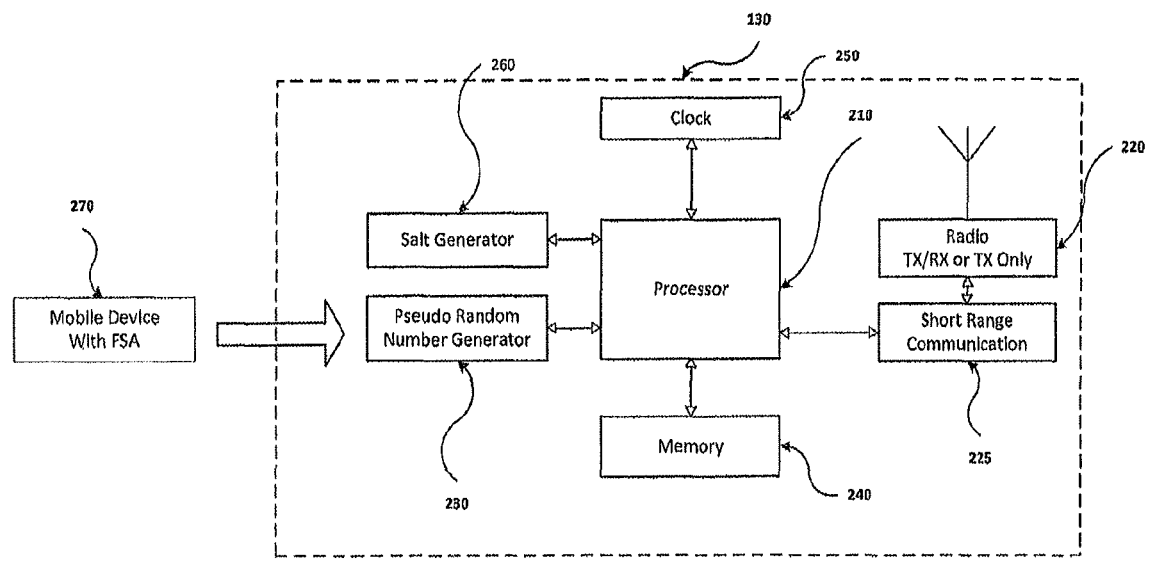
FIG. 2 is a block diagram of an example tag device that may be used in an embodiment of the invention.

FIG. 2 is a block diagram of an example tag 130 suitable for use with the example embodiment of the invention. The tag includes a processor 210, radio 220, PN generator 230, memory 240, clock circuit 250 and Salt generator 260. The processor 210 may be a microprocessor or microcontroller operating under control of a stored program. Alternatively, it may be implemented as an application specific integrated circuit (ASIC), a field-programmable gate array (FPGA) or a custom-designed circuit that performs the functions described below. In the example embodiment, the radio 220 may be a Bluetooth low-energy (Ble) transmitter or a Ble transceiver. In an alternative embodiment, described below, the tag may also include a short-range transceiver 225 to maintain clock synchronization. This may be, for example, a Bluetooth, NFC or 802.14 (Zigbee) transceiver.

In one embodiment, the Ble transmitter transmits a Ble non-connectable undirected advertisement (NON-CON-ADV) message. This is a broadcast message that may be received by any Ble listening device 120 without the listening device being paired to the Ble transmitter or transceiver. This message has a restricted payload of 31 bytes, including protocol overhead. In the example embodiment, the tag identifier and other data, as described below with reference to FIG. 5, are sent in 16 bytes (128 bits) of this message. Although the tag 130 is described as using Ble, it is contemplated that it may use other short-range transmission techniques such as Bluetooth, NFC or 802.14 (Zigbee®).

Because the received Salt is never used, the Salt generator may be a PN generator or it may be a true random number generator that produces random numbers, for example, by sampling amplified noise signals, e.g. resistor noise. Alternatively, the Salt generator may calculate on or more permutations of bits provided by the PN generator 230. In one implementation, the Salt generator operates with a period of S seconds and the PN generator operates with a period of K seconds. In this implementation, S is less than K and K=I*S, where I is an integer. The values of S and K, the schedule values for changing the Salt value and the key, can be set based on the desired security of the system. Small values for these two variables tend to make the system more secure. For an example retail store application, S may be in the range of one hour to two days and K may be in the range of one day to two weeks.

In this implementation, both the Salt and the key are used to obfuscate the tag ID. It is contemplated that, depending on the level of obfuscation that is desired, the Salt may be omitted or applied differently to the tag data, in a cycle, each time it is used.

Figure 3:
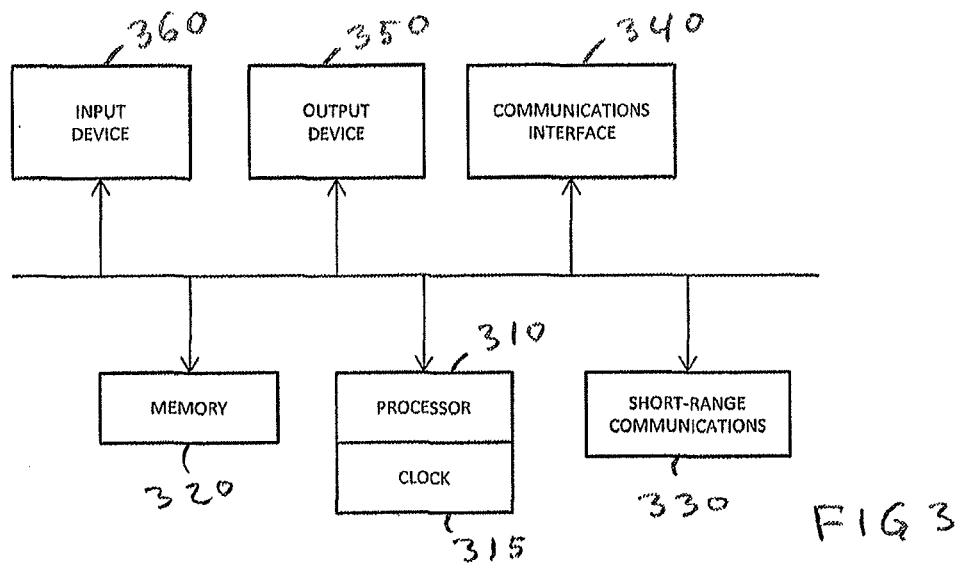
FIG. 3 is a block diagram illustrating details of an example device which may be used for a server or mobile device in an embodiment of the invention.

FIG. 3 is a block diagram of components that may be used in a listening device 220 or in the server 140. These devices include a processor 310 having a clock circuit 315, memory 320, input device, for example a keyboard (now shown), keypad (not shown) or touchscreen (not shown). The example device also includes an output device, for example an LCD or LED display (not shown) or a touchscreen (not shown). Both the server 140 and mobile listening device 120 include a communications interface which may be any communications interface that allows communication between the server and the mobile listening device. These may be, for example, an 802.11 WiFi transceiver, a cellular transceiver or an 802.14

Zigbee transceiver. The mobile listening device 120 may also include a short-range communications receiver or transceiver 330. All of the components 310, 320, 330, 340, 350 and 360 may be connected by an internal bus 370. This is an example configuration. It is contemplated that the functions of the listening device 220 and server 140 may be implemented using a programmed microprocessor or microcontroller or in an ASIC or FPGA. The example server maintains a clock value that forms the time base for the system and generates encryption keys using the same algorithm as the tags 130. These functions may be implemented as separate hardware elements or using software running on a microprocessor or microcontroller.

In the example mobile listening device, the processor 310, memory 320, input device 360 and output device 350 are configured to run one or more applications (APPs) that make use of the tag ID information provided by the tags 130. As described above, this APP may be a shopping application that uses the detected tag IDs to make offers to shoppers in a retail establishment. Alternatively, it may be a game application allowing a user to interact with other users having tags or with tags in the environment. It may also be a geofencing application controlling access to rooms or areas within a space based on the tag ID and the ID of the listening device. These APPs may also transfer data to or receive data from the server 140 via the communications interface 340.

Figure 4:
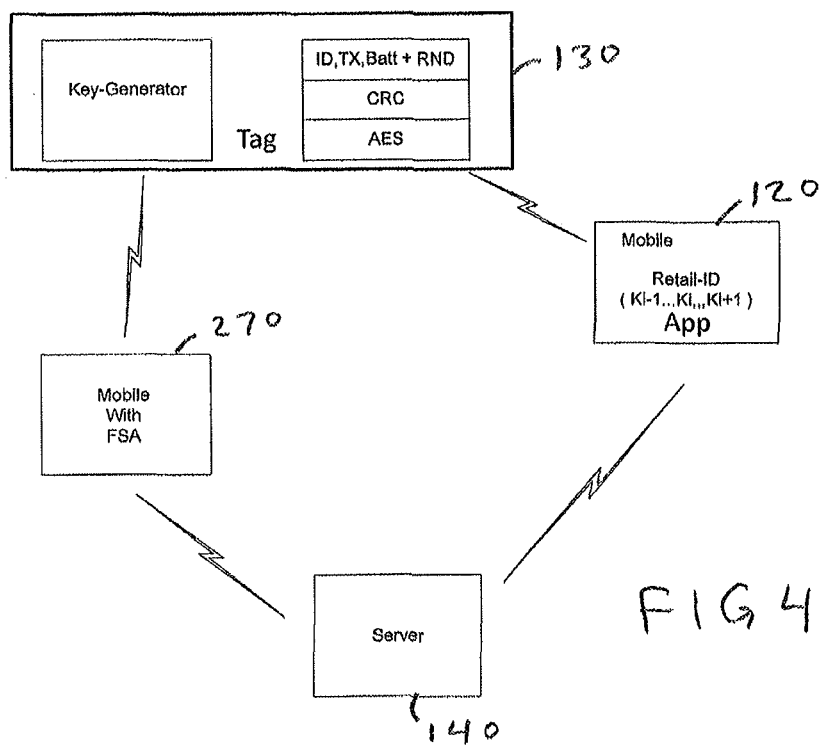
FIG. 4 is a block diagram that is useful for describing interaction among the component parts of a system including an embodiment of the invention.

FIG. 4 is a block diagram that shows the elements of an example system. In addition to the mobile listening device 120, tag 130 and server 140, the example system includes an additional mobile device 270 including a field service application (FSA). As described below, an example FSA obtains the current clock value and the schedule values for S and K from the server via a secure connection and provides these values to the tags 130 also via a secure connection. The tags 130 use these values to control the key generator 230, and clock circuit 250 of the tag 130.

Operation of the system is now described with reference to FIGS. 1-4. The tags 130a-n are applied to the shelving units 110 in the store by one or more store employees. Several employees may each have a mobile device 270 including the FSA. The FSA communicates with the server 140, preferably by a secure communications channel, to obtain four values: the current time and the current seed for the PN generator 230 and values for S and K. In one embodiment, the schedule for changing the key and the Salt (e.g. values for S and K) may be preprogrammed by the manufacturer and the server 140 provides the mobile device 270 with values for the current time and PN seed. The mobile device 270 may then establish a secure communications channel with tag 130 so that it may transfer the PN seed and current time value and the values of S and K to the tag. Alternatively, the tag may include input circuitry to receive this information via a physical connection such as a serial interface (e.g. a USB port) externally accessible on the tag 130.

In the example embodiment, the server 140 maintains a master clock value and includes a PN generator that operates according to the same algorithm as the PN generator 230 of the tag 130. The server 140 also maintains the values K and S and generates encryption keys at intervals determined by the current clock value and the value K. Whenever the clock of one of the tags 130 has drifted beyond the ability of the system to compensate, the server 140 may synchronize the tag by sending its internally maintained clock value and the current seed value to a mobile device 270 including the FSA and having the FSA transfer the values to the tag.

These values set up the tags so that they operate, at least initially, with a common time base provided by the server via the FSA application. The example tags rely on their internal clock circuitry 250 and the values S and K to determine when to generate a new key and when to generate a new Salt value. Over time, the clock circuits 250 of the tags 130 will drift with respect to each other. The system is configured to be compensate for some level of drift, as described below. When the drift exceeds the compensation capabilities of the system, however, one or more of the tags 130 may need to be brought into alignment with the server 140. This may also be done using a MESH network where each of the tags periodically listens for and broadcasts a MESH message. Some of these MESH messages may be commands associated with time information implementing a time synchronization system akin to a network time protocol (NTP) system.

Once it has been set-up, the example tag 130 generates 128 bits encryption key values that are used for AES encryption and the Salt values according to the schedule determined by the timing values S and K. The current Salt value is combined with the tag ID and other data relevant to the operation of the tag to produce the tag data. The tag then calculates checksum value for the tag data, for example, a cyclic redundancy code (CRC) value, and encrypts at least the tag data using the current key value. This encrypted data is broadcast in a NON-CON-ADV message. When indicated by the clock circuitry, the tag calculates a new value for the Salt and/or the key.

Figure 5A:
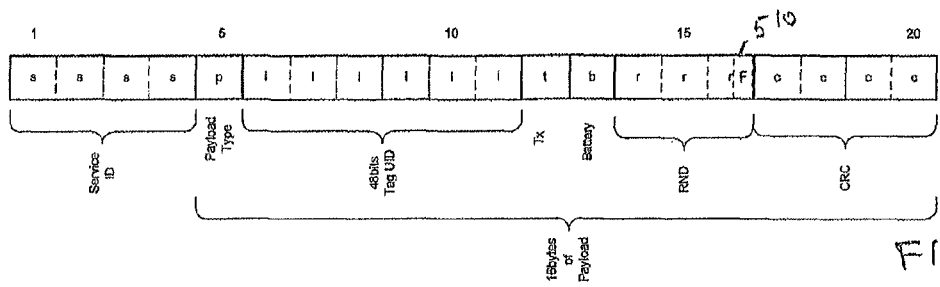
FIGS. 5A, 5B, 5C and 5D are a data diagrams that are useful for describing an example value provided by the tag device of FIG. 2.

FIGS. 5A-5D are data diagrams showing example structures 500 for the tag data that have different formats. FIGS. 5A-5D represent a sequence of tag values that may be changed with a period of T seconds. The period T may be greater than or less than the period S at which the Salt is changed. For example, T may range between S/4 and 4S. Alternatively, the tag data configuration may change at the same time that the Salt changes (S=T). The example includes 20 bytes of data. In FIG. 5A, the first four bytes, s, are a service ID which, identifies the message type. The next byte, p, indicates a payload type which identifies the message as a tag ID message. The next six bytes, i, are a unique ID (UID) value. The next two bytes, t and b, indicate the current transmission power and battery level, respectively. The next three bytes, r, are the Salt and the final four bytes, c, are the CRC ckecksum.

Figure 5B:
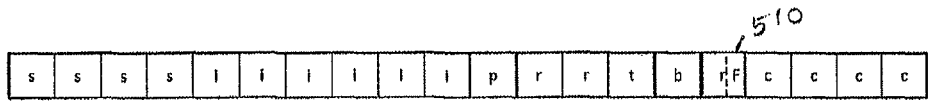
Figure 5C:
Figure 5D:
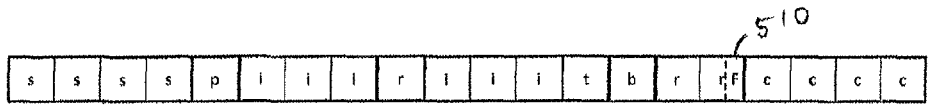

The last 16 bytes of this value are encrypted using AES and the 128 bits encryption key generated by the PN generator 230. FIGS. 5B-5D show example alternative arrangements of the data. In FIG. 5B, the UID value is placed immediately after the service ID, the payload type is next followed by two bytes of the salt, the transmission power and battery bytes and the final byte of the Salt. In these structures, the three bytes of the Salt are inserted in different places. In one implementation the tag data, except for the service ID may be scrambled as a function of the clock value. In all of these example embodiments, the key is applied to 16 bytes of the tag data including all or a part of the tag ID and at least a part of the Salt. In these examples, the service ID is not encrypted. In general, any data that does not change, except for the UID of the tag, may be transmitted without being encrypted.

One byte of the example Salt data is in a fixed position in all of the example structures. This byte includes a two-bit flag value, 510 that is used to identify the tag data configuration. Although the examples described above manipulate the tag data in byte intervals, it is contemplated that it may be manipulated in individual bit values. For example, individual bits of the Salt value may be inserted between bits of the other data values. The configuration of the tag data is desirably known to both the tag 130 and the mobile listening device 120 so that the Salt data may be removed from the tag data.

If a variable tag data configuration, such as that shown in FIGS. 5A-5D is used, it is desirably set by the server. The server may provide the variable configuration data to the mobile device 170 with the FSA so that the FSA can communicate it to the tags 130. The server may also provide configuration data to the mobile listening device 120. This configuration data may indicate, for example, where the flag data is located and the tag data configuration corresponding to each flag value. It is contemplated that the configuration(s) of the tag data may change periodically, for example, every time the FSA application re-synchronizes the tags, so that any variable configuration data sent to a mobile listening device 120 has a limited lifetime.

The data shown in FIGS. 5A-5D as being transmitted by the tags 130 is one example. It is contemplated that other data may be transmitted. For example, in a retail environment, it may be desirable to transmit information identifying the retailer so that the tags from one store are not confused with tags from a neighboring store. The retailer ID may be transmitted as clear text or it may be a part of the 16 bytes of encrypted data, for example, it may be included in the UID value.

The receiving device, in the example implementation, the listening device 120 running the store APP, reads these two bits flag 510 to determine the tag data configuration, deletes the Salt data and then extracts the tag ID data according to the format indicated by the flag bits. Alternatively, the system may use a single tag data configuration, for example the format shown in FIG. 5A for all transmissions.

Figure 6:
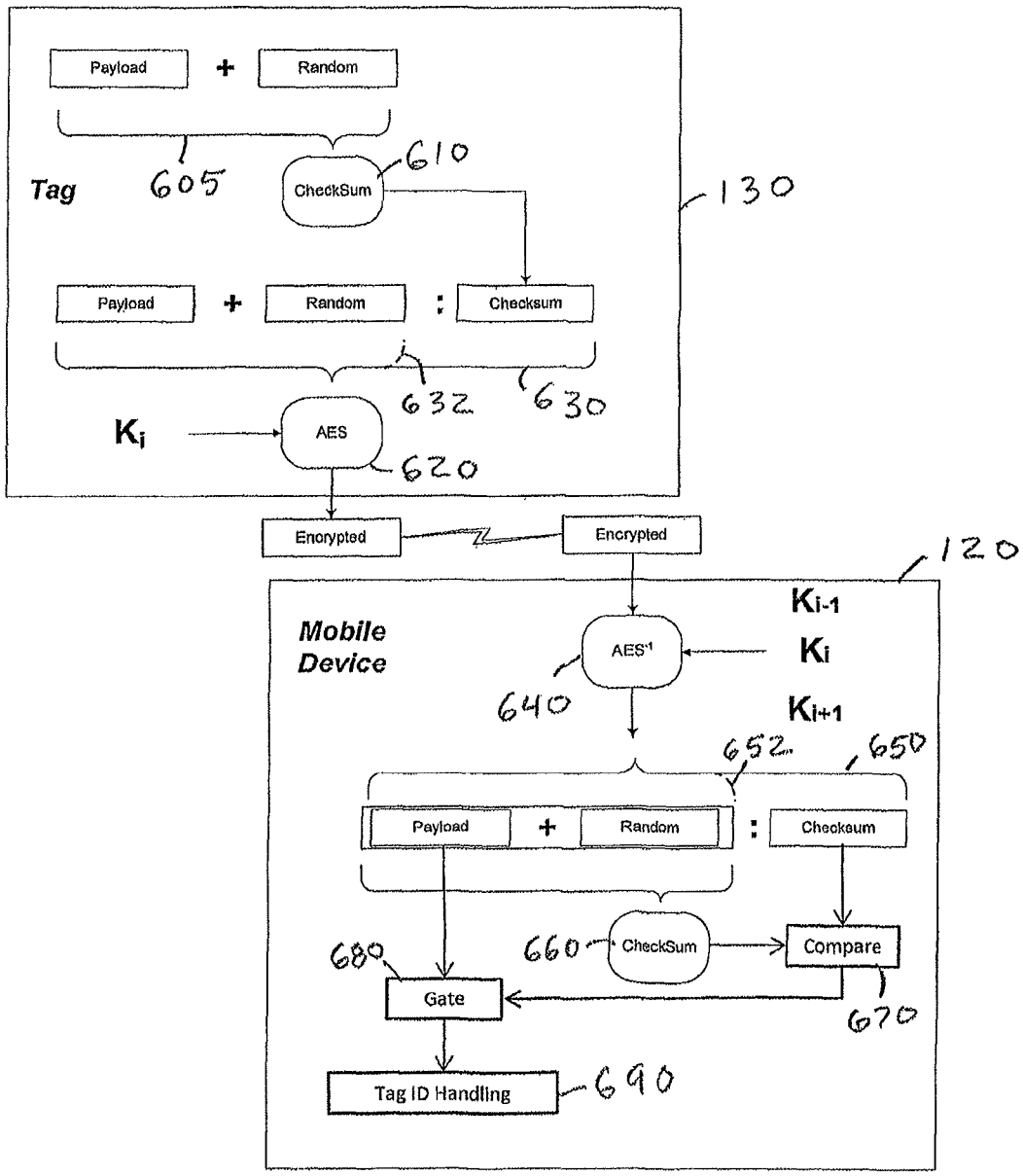
FIG. 6 is a functional block diagram that is useful for describing the operation of an example embodiment of the invention.

FIG. 6 is a functional block diagram that is useful for describing steps that may be performed in one example implementation. As shown in FIG. 6, the payload is combined with the random or pseudo-random Salt value to form a value that is applied to the checksum generator 610. In one implementation, the checksum is part of the value that is encrypted and in another implementation, the checksum is separate from the encrypted value. In both implementations, the checksum is a four-byte value. When the checksum is part of the encrypted value, the combination of the payload and Salt is 12 bytes so that the combination of the payload, Salt and checksum is 16 bytes, or 128 bits. When the checksum is separate from the encrypted value, the combination of the payload and Salt is 16 bytes. Alternatively, other data, for example a four-byte retailer ID may be included in the tag data to provide 16 bytes of tag data for use with the example 128 bit key.

As described above, in one implementation, the checksum is concatenated onto the combination of the payload and Salt and the result is encrypted using AES encryption block 620 with the current encryption key, $K_j$. When the checksum is separate from the encrypted value, only the payload and the Salt are applied to the block 620, as indicated by the brace 632. When the checksum is part of the encrypted value, all three values are applied to the AES block 620 as indicated by the brace 630. The service ID value, which identifies the message type message is not encrypted.

If the short-range radio 220 of the tag 130 is a Ble device, the encrypted value produced by the AES block 620 may be broadcast by the tag 130 as a NON-CON-ADV message. The application running on the mobile listening device 120 receives the message and applies it to an inverse AES block 640. As described above, all of the tags 130 are initially referenced to a common time base, including the initial clock value and values for the respective periods K, S and, optionally T, at which the encryption key, Salt and, optionally, tag data configuration change based on their internal clock values. As time progresses, the clocks of the various tags 130 may drift with respect to one another and to the absolute reference maintained by the server, so that a tag with a slower clock circuit encrypts its tag values with key $K_i$ while a tag with a faster clock circuit encrypts its tag values with key, $K_j$, where j is greater than i.

The mobile device 120 does not generate encryption keys but, instead, is supplied key values by the server 140. In this embodiment, the mobile device is supplied with three key values, $K_{i-1}$, $K_i$ and $K_{i+1}$. This is only an example. It is contemplated that the mobile device may be provided with more or fewer key values. The mobile listening device 120 is configured to try multiple key values until it finds the key value that was used to encrypt the tag data as determined by the matching transmitted and regenerated checksum values.

In one implementation, the application running on the mobile listening device first tries the key $K_i$. The result of decryption operation performed by the inverse AES block 640 is separated into the payload, Salt and checksum values. The payload and Salt are applied to a checksum block 660 that generates a checksum value which should be identical to the value produced by the checksum block 610 in the tag 130. These values are compared in a comparator 670. If the values are equal then the key used to decrypt the tag data was correct and the comparator 670 activates a gate which passes the payload data to the tag ID handling process of the application.

If the checksum values are not equal then the application attempts to decrypt the received broadcast message using a different key, for example, $K_{i+1}$. If $K_{i+1}$ is not successful, the example application next tries $K_{i-1}$. The application may try several keys before it identifies the correct one. When one of the keys used by the mobile listening device 120 has not been used successfully for a threshold number of decoding events, the device 120 may retire the key and request another key or keys from the server 140.

One reason that the mobile listening device 120 uses multiple keys is because the tags are not synchronized. As described above, with reference to FIG. 2, each tag may also include a short-range transceiver 225. This may be, for example, an 802.14 Zigbee transceiver. Using this transceiver, the tags 130 in a particular venue may synchronize their clocks using, for example, a network time protocol (NTP). Using this protocol, the tags 130 are arranged in tiers, based on their neighboring tags in a mesh network, so that tags in a lower tier periodically communicate clock values with tags in the next higher tier. The tag or tags in the bottom tier may receive a clock value from the server 140. In one implementation, the tags may be configured to receive and transmit time values once each day so that the clock circuits in the various tags 130 remain roughly synchronized.

As described above, the checksum may be part of the encrypted value or it may be separate from the encrypted value and broadcast in the NON-CON-ADV message as clear text along with the service ID. If the checksum value is separate then only the payload and the Salt are provided by the inverse AES block 640, as indicated by the brace 652. If the checksum value is a part of the encrypted value then all three values are provided by the block 640, as indicated by the brace 650.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A short-range communication tag, comprising:
a transmitter;
a clock circuit providing a clock value that changes with a period of a clock signal;
a memory storing a unique identification value;
a processor, coupled to the memory, the clock circuit, and the transmitter, the processor configured to:
insert bits of a Salt value into the unique identification value to generate a salted identification value;
generate a sequence of encryption keys, wherein the processor is configured to generate new encryption keys in the sequence of encryption keys with a period of K seconds, according to a schedule, where K is an integer; and
for a current encryption key in the sequence of encryption keys:
encrypt the salted identification value and a checksum value calculated for the salted identification value with the current encryption key, according to a predetermined encryption method, to generate an encrypted tag identification value; and
cause the transmitter to transmit the encrypted tag identification value,
wherein the encrypted tag identification value is configured such that when the encrypted tag identification value is received by a mobile listening device, the mobile listening device:
processes at least a portion of the encrypted tag identification value to generate a decrypted value including the salted identification value and the checksum value,
extracts the checksum value from the decrypted value, generates a further checksum value of the salted identification value,
compares the checksum value and the further checksum value, and
in response to the checksum value matching the further checksum value, removes the Salt value from the salted identification value to generate the unique identification value.

2. The short-range communications tag according to claim 1, wherein the processor is configured to generate a sequence of pseudo-random number (PN) values as the sequence of encryption keys.

3. A mobile listening device comprising:
a short-range receiver;
a memory storing a plurality of encryption keys; and
a processor coupled to the short-range receiver and the memory, the processor being configured to:
receive an encrypted tag identification value via the short-range receiver;
process at least a portion of the encrypted tag identification value using a predetermined decryption method and one of the plurality of encryption keys to generate a decrypted value including a salted identification value and a checksum value;
extract the checksum value from the decrypted value;
generate a further checksum value of the salted identification value;
compare the checksum value and the further checksum value; and
in response to the checksum value matching the further checksum value, remove a Salt value from the salted identification value, as identified by predetermined configuration data, to generate a unique identification value.

4. The mobile listening device according to claim 3, wherein the processor is further configured to:
in response to the checksum value not matching the further checksum value:
process at least the portion of the encrypted tag identification value using the predetermined decryption method and another one of the plurality of encryption to generate a second decrypted value including a second salted identification value and a second checksum value;
extract the second checksum value from the second decrypted value;
generate a second further checksum value of the second salted identification value;
compare the second checksum value and the second further checksum value; and
in response to the second checksum value matching the further checksum value:
remove the Salt from the second salted identification value, as identified by the predetermined configuration data, to generate the unique identification value.

5. A method for encrypting a tag identifier (ID) of a short-range communications tag, comprising:
retrieving, by a processor of the short-range communications tag, a unique identification value from a memory;
inserting, by the processor, bits of a Salt value into the unique identification value to generate a salted identification value;
generating, by the processor, a sequence of encryption keys with a period K seconds, as determined by a clock value;
encrypting, by the processor, the salted identification value and a checksum value calculated for the salted identification value using a currently generated one of the encryption keys according to a predetermined encryption algorithm to generate an encrypted tag identification value; and
broadcasting the encrypted tag identification value by a transmitter coupled to the processor,
wherein the encrypted tag identification value is configured such that when the encrypted tag identification value is received by a mobile listening device, the mobile listening device:
processes at least a portion of the encrypted tag identification value to generate a decrypted value including the salted identification value and the checksum value,
extracts the checksum value from the decrypted value, generates a further checksum value of the salted identification value,
compares the checksum value and the further checksum value, and
in response to the checksum value matching the further checksum value, removes the Salt value from the salted identification value to generate the unique identification value.

6. The method for encrypting the tag ID according to claim 5, further comprising:
generating, by the processor, a pseudo-random number (PN) value as the Salt value with a period of S seconds, where S is an integer and K is a multiple of S.

7. The method for encrypting the tag ID according to claim 6 further comprising:
establishing a communications channel with a field service application; and
receiving, via the communications channel, a seed value for use in generating the encryption keys, a reference value for the clock value, and the values of K and S.

8. An apparatus, comprising:
a clock generator having a clock value that changes in response to a clock signal;
a transceiver;
a memory;
a processor coupled to the transceiver, the clock signal generator and the memory, the processor configured to:
generate a sequence of encryption keys and seed values including, a current encryption key and a current seed value and store at least a portion of the sequence of encryption keys and seed values in the memory;
retrieve from the memory the current seed value and the current encryption key;
establish a transmission connection with a field service application and a listening device via the transceiver;
transmit the current seed value and a current clock value to the field service application via the transmission connection; and
transmit the current encryption key to the listening device via the transceiver,
wherein the listening device:
processes at least a portion of an encrypted tag identification value to generate a decrypted value including a salted identification value and a checksum value,
extracts the checksum value from the decrypted value, generates a further checksum value of the salted identification value,
compares the checksum value and the further checksum value, and
in response to the checksum value matching the further checksum value, removes a Salt value from the salted identification value to generate a unique identification value.

9. The apparatus according to claim 8, wherein the processor is configured to generate a sequence of pseudo-random number (PN) values as the sequence of encryption keys.

10. The apparatus of claim 8, wherein the processor is configured to establish a secure transmission connection as the transmission connection with the field service application.

11. The apparatus of claim 8, wherein the memory is configured to hold a new key generation schedule value and a new Salt generation schedule value; and
the processor is configured to transmit the new key generation schedule value and the new Salt generation schedule value to the field service application with the retrieved seed value and the current clock value via the transmission connection.

12. The apparatus of claim 8, wherein the processor is further configured to:
transmit multiple ones of the encryption keys to the listening device via the transceiver; and
receive, from the listening device, a tag ID.

13. The apparatus of claim 12, wherein the memory is configured to hold at least a previous encryption key and a next encryption key in addition to the current encryption key as the multiple encryption keys and the processor is configured to transmit the previous encryption key, the current encryption key and the next encryption key to the listening device via the transceiver.

14. The apparatus of claim 12, wherein the processor is configured to:
receive, via the transceiver, a request from the listening device for a further encryption key;
generate the further encryption key as a key in the sequence following the next encryption key; and
transmit the further encryption key to the listening device via the transceiver.

* * * * *